Patented May 26, 1942

2,284,593

UNITED STATES PATENT OFFICE 2,284,593

PROCESS FOR DECOLORIZING SOLUTIONS

Max Seidel, Sölln, Germany

No Drawing. Application August 3, 1938, Serial No. 222,919. In Germany August 12, 1937

3 Claims. (Cl. 210—62)

Activated charcoal is much used in industry for an adsorption agent for decolorizing solutions. However, if the solutions are strongly colored, very large quantities of such adsorption agents are required even if the adsorption is carried out in such a manner that charcoal which is already partly charged with coloring matter is employed for the adsorption of the first larger quantities of coloring matter from the crude solutions. The regeneration of the charcoal is rather troublesome and expensive and therefore the process of decolorizing with the use of activated charcoal is not suitable for cheap solutions of which large quantities are accumulated, such as wood sugar worts.

For decolorizing such solutions, lignin which is accumulated as a by-product in the saccharification of woods, has been tried as a cheap decolorizing agent. The decolorizing power is indeed less than that of activated charcoal, but the lignin is always available in plentiful quantities on the spot where the wood sugar solution is produced, and it costs practically nothing because it can be burnt as previously after it has been used up. It has now been found by experiment that the adsorption power of lignin greatly increases as the temperature falls, in contra-distinction to that of activated charcoal which often exhibits increased adsorption power at elevated temperatures. This dependence of lignin on the temperature is so great that, when the temperature rises, the substances adsorbed are returned almost quantitatively back to the original liquid or to another liquid, for example water. Lignin therefore represents an adsorption agent which can be regenerated in an extremely simple manner. The coloring matter which has been adsorbed in the cold, for example from wood sugar worts, can be given up on heating to, for example wood sugar worts which have not been decolorized and are to be used for purposes other than those for which the decolorized solution is used. For example, crystallized sugar or yeast for baking and nutritive purposes might be obtained from the decolorized wood sugar solution, while the part of the wood sugar solution which takes up the coloring matter again may be fermented to make alcohol or can be worked up into fodder yeast. In this way losses of sugar on regeneration are avoided.

Lignin which originates from the saccharification of wood or other cellulose-containing materials by treatment with dilute acid under pressure has proved very suitable since this material is particularly pure.

When working on the countercurrent principle the coloring matter and the like which is taken up from one part of the wood sugar solution can be transferred to another part of undecolorized solution in such a high concentration that a considerable part of the substances taken up is precipitated when the solution is cooled down again. In some cases separation may also be effected by separators, filters or by conducting the material over bodies having a large superficial area. In this way it is possible to decolorize the whole of the solution to be treated. It is also possible to obtain directly the substances which are precipitated from the super-concentrated solutions which are formed by the hot washing out of the adsorbed substances from the lignin. By treating the lignin which effects the adsorption with steam, a large part of the adsorbed substances can be removed together with the condensed steam, or the removal can be effected by relatively small quantities of hot water or another hot extraction agent, which may be the same as the solution treated (wood sugar wort), or different therefore. In addition to coloring matters, salts and other substances dissolved in liquids are also bound by the lignin and are given up again on being washed with hot wood sugar wort or water. This property of lignin can be advantageously employed, for example, in order to recover from fermented solutions a substantial proportion of the residual substances, for example inorganic or organic nitrogen, phosphoric acid, and so forth, which are not consumed during the fermentation and to transfer them to fresh unfermented solutions. The properties of the waste liquor from the fermented solutions are considerably improved owing to the removal of these substances. Also, in yeast culture, for example, one can work with an excess of nutrient salts during fermentation without losses occurring.

The properties of lignin as an adsorption or decolorizing agent can be influenced by suitable preliminary or intermediate treatments, for example by treatment with superheated steam or with certain acids and other chemicals.

I claim:

1. In a cyclic process for decolorizing aqueous solutions, the steps comprising treating the solutions at normal temperature with lignin obtained in the saccharification of wood with dilute acid, then treating the lignin with hot wood sugar wort to regenerate such lignin and then employing the regenerated lignin for decolorizing further solutions.

2. In a cyclic process for decolorizing solutions, the steps which comprise treating a solution to be decolorized at normal temperatures with lignin obtained in the saccharification of wood, then treating the lignin with another portion of the solution to be decolorized in the heated state to regenerate such lignin, and then employing the regenerated lignin for decolorizing further solutions.

3. A process for transferring residual substances in a batch fermented solution to a fresh batch of such solution in unfermented state, which comprises treating the fermented solution with lignin at normal temperature to absorb the residual substances, and then treating the lignin with the fresh batch of unfermented solution in the heated state whereby the absorbed residual substances are transferred to the fresh batch of unfermented solution.

MAX SEIDEL.